United States Patent [19]

Frazita

[11] 4,188,633

[45] Feb. 12, 1980

[54] PHASED ARRAY ANTENNA WITH REDUCED PHASE QUANTIZATION ERRORS

[75] Inventor: Richard F. Frazita, Deer Park, N.Y.

[73] Assignee: Hazeltine Corporation, Greenlawn, N.Y.

[21] Appl. No.: 872,525

[22] Filed: Jan. 26, 1978

[51] Int. Cl.[2] .......................... H01Q 1/50; H04B 7/00

[52] U.S. Cl. .............................. 343/854; 343/100 SA

[58] Field of Search .......................... 343/100 SA, 854

[56] References Cited

U.S. PATENT DOCUMENTS 3,387,301 6/1968 Blass et al. .......................... 343/854

3,999,182 12/1976 Moeller et al. ................ 343/100 SA

OTHER PUBLICATIONS

Merrill I. Skolnik, *Radar Handbook*, (New York: McGraw-Hill, 1970), pp. 11-35 through 11-43.

*Primary Examiner*—Paul L. Gensler
*Assistant Examiner*—Harry E. Barlow

[57] ABSTRACT

A phased array antenna includes a coupling network which is arranged to supply signals to pairs of elements located on opposite sides of the array center with a phase difference which is an odd-integral multiple of one-half the smallest phase step of the array phase shifters. This coupling network arrangement reduces antenna beam pointing errors which arise from a phase quantization of the array phase shifters.

12 Claims, 11 Drawing Figures

$\epsilon' = (\phi_{34} - \phi_{34'}) - (\phi_{44} - \phi_{44'})$
AND
$(\phi_{54} - \phi_{54'}) - (\phi_{64} - \phi_{64'})$

PHASED ARRAY ANTENNA WITH REDUCED PHASE QUANTIZATION ERRORS

BACKGROUND OF THE INVENTION

This invention relates to phased array antenna systems, and particularly to such systems which are used for direction finding applications.

FIG. 1 illustrates a typical prior art phased array antenna system. Wave energy signals from a transmitter 11 are supplied to antenna elements by coupling network 13. The phase of signals supplied to each element 10, 12, 12', 14 14', 16, 16', 18, and 18' is nominally the same. Phase shifters 20, 22, 22', 24, 24', 26, 26', 28, and 28', each associated with one of the elements, are provided for varying the phase of wave energy signals, thereby to change the direction of the antenna beam radiated from the antenna. Since the antenna is fully reciprocal, transmitter 11 may be replaced with a receiver, and the phase shifters used to change the direction from which signals are received.

The phase shifters used in the antenna of FIG. 1 are typically digital phase shifters such as illustrated in FIG. 1A. The FIG. 1A phase shifter is a 3-bit phase shifter, which may typically be a diode or ferrite device. The phase shifter includes a bit 15 for changing input phase by 180°, bit 17 for changing phase by 90°, and bit 19 for changing phase by 45°. Those familiar with such phased array antenna systems will understand that such digital phase shifters may have a larger or smaller number of bits, and that the bits are switched "on" or "off" by phase control signals to change the phase of supplied signals to approximate the desired phase. This approximation is more accurate if a larger number of "bits" are provided in the phase shifter.

FIG. 2 is a graph illustrating the ideal phase of wave energy signals to be supplied to the elements of the FIG. 1 array in order to steer the antenna beam to a selected radiation scan angle $\theta$, indicated in FIG. 1. For convenience, the required phase for each element is reference to the phase at central element 10, and plotted as a function of sine $\theta$ so that the phase functions are linear. It should be recognized that the phase values illustrated may be referenced to any particular phase value, or to the phase supplied to any particular element. The phase of element 10 has been selected as a reference phase merely for convenience.

Since the phase shifter of FIG. 1A cannot assume all values of phase change, in order to steer the antenna beam, it is necessary to set the phase bits 15, 17, and 19 to approximate the phase conditions illustrated in FIG. 2. FIG. 3 is a graph illustrating the phase of wave energy signals to be supplied to elements 14 and 14', which are symmetrically located in the array with respect to the array center. The graph illustrates only phase values for positive scan angles, and again, for convenience, phase values are plotted against the sine of the scan angle $\theta$. The stepped lines in the graph illustrate the values which will be assumed by phase shifters 24 and 24' in order to approximate the required phase function at various antenna scan angles. From the graph, it is evident that the phase difference between the values of phase shifters 24 and 24' is not always the same as the ideal phase difference for perfect beam scanning. The difference between the ideal and actual phase difference is phase error $\epsilon$, which results in a pointing error in the radiated antenna beam. FIG. 4 is a graph illustrating the variation in the phase error for elements 14 and 14' as a function of the sine of the scan angle. This phase error has a maximum amplitude of ±45° assuming 3-bit phase shifters. While it should be recognized that the presence of many elements in a phased array antenna tends to reduce the effect of this phase error, which arises from phase quantization, there will remain some inaccuracies in the steering direction of the array antenna as a result of the phase error in the phase difference between elements on opposite sides of the array center.

The antenna beam pointing error, which arises from phase quantization is relatively small and unimportant in many systems. In a high accuracy direction finding system, such as a microwave landing system or tracking radar, the phase quantization beam pointing error may be significant. It is also desirable to reduce phase quantization errors because the error may increase antenna sidelobes, an undesired effect in certain applications.

It is therefore an object of the present invention to provide an improved phased array antenna system having reduced phase quantization error.

SUMMARY OF THE INVENTION

In accordance with the invention, there is provided a phased array antenna system having a plurality of antenna element pairs arranged on an aperture. The elements of each pair are oppositely located with respect to a plane passing through the aperture. Coupling means are provided for supplying wave energy signals to the elements. The coupling means include digital phase shifters for varying the phase of the wave energy signals in discrete phase steps. The phase length of the coupling means is selected so that wave energy signals, supplied to the elements in each pair, have a phase difference which is always approximately an odd-integral multiple of one-half the smallest phase step of the phase shifters.

The elements are preferably located symmetrically with respect to a plane which passes through the center of the aperture. The phase shifters are preferably responsive to phase control signals, which cause the phase of wave energy signals supplied to each element to be approximately a predetermined function of the desired antenna radiation angle.

For a better understanding of the present invention, together with other and further objects, reference is made to the following description, taken in conjunction with the accompanying drawings, and its scope will be pointed out in the appended claims.

BRIEF DESCRIPTION OF THE DRAWINGS

FIG. 1 A is a block diagram of a digital phase shifter.

DESCRIPTION OF THE INVENTION

Figure 1:
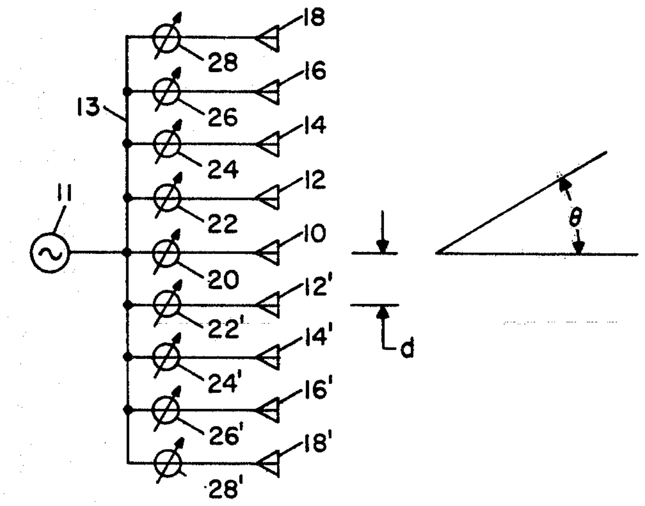
FIG. 1 (PRIOR ART)
FIG. 1 is a schematic diagram of a phased array antenna system in accordance with the prior art.
Figure 1A:
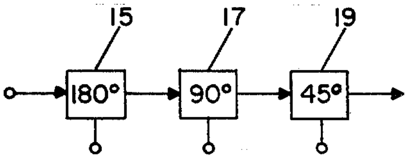
FIG. 1A (PRIOR ART)
Figure 2:
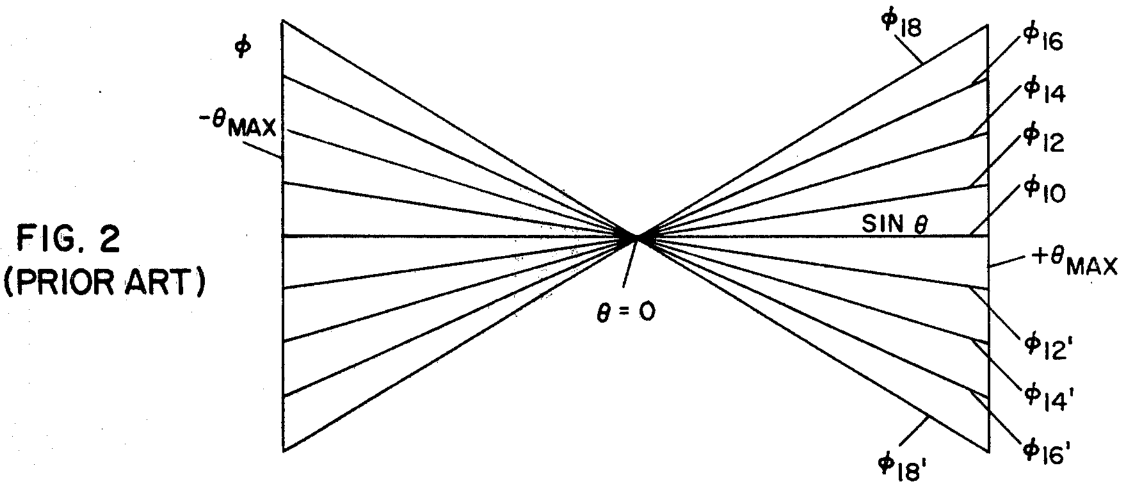
FIG. 2 (PRIOR ART)
FIG. 2 is a graph illustrating phase functions for the elements of the FIG. 1 antenna plotted against the sine of the radiation angle.
Figure 5A:
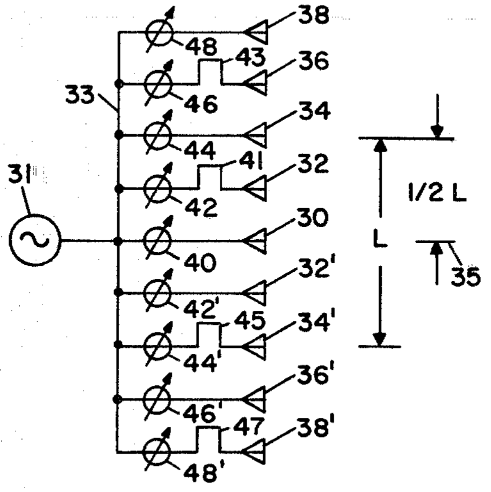
FIG. 5A is a schematic diagram of an antenna in accordance with the present invention.
Figure 5B:
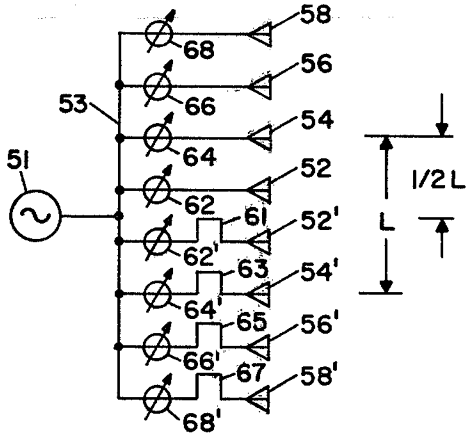
FIG. 5B is a schematic diagram of another antenna in accordance with the present invention.

FIGS. 5A and 5B illustrate antennas constructed in accordance with the present invention. In each case, antenna elements are grouped in pairs of elements which are oppositely located with respect to the center of the array aperture. In the FIG. 5A antenna, which has an odd number of elements, element 30 is unpaired, but elements 32, 34, 36, and 38 are paired with elements 32', 34', 36', and 38', respectively, which are oppositely located on a plane with respect to a perpendicular plane 35 at the array center. Coupling network 33 supplies signals to the elements from transmitter 31. One of the elements in each pair is provided with a fixed phase adjustment in the coupling network, such as phase adjustments 41, 43, 45, and 47. The phase adjustments have a magnitude of one-half the value of the smallest bit in the phase shifters 40, 42, 42', 44, 44', 46, 46', 48, 48' of the array. Thus, if the array is provided with 3-bit phase shifters, such as that illustrated in FIG. 1A, phase adjustments 41, 43, 45, and 47 will have a value of 22.5°. In the FIG. 5A antenna the phase adjustments are provided on alternate adjacent elements so that each element without a phase adjustment has at least one adjacent element with a phase adjustment provided in the coupling network.

The FIG. 5B array has an even number of elements 52, 52', 54, 54', 56, 56', 58, 58' and consequently there is no unpaired central element. Likewise, the FIG. 5B antenna is provided with coupling network 53 connecting the elements to transmitter 51. The coupling network includes phase shifter 62, 62', 64, 64', 66, 66', 68, and 68'. Unlike the FIG. 5A antenna, all of the phase adjustments 61, 63, 65, 67 are provided at the elements on the lower half of the array. As is known to those familiar with the art, the ideal phase difference function between elements in a pair, for example, pair 34, 34' of the FIG. 5A antenna and pair 54, 54' of the FIG. 5B antenna is dependent on the space L between the elements, as well as the desired scan angle *θ*. For purposes of explaining the operation of the invention, it will be assumed that there is equal spacing L between element pairs 34, 34' and 54, 54' so that there is ideally the same phase difference between signals supplied to these elements for any particular antenna radiation angle.

While the phase adjustments in FIGS. 5A and 5B are illustrated as being arranged between the antenna element and the phase shifter, those familiar with the art will recognize that the phase adjustments may be located at any point in the antenna coupling network provided the required phase difference exists at the antenna radiating element. Likewise, those familiar with the art will recognize that the phase adjustment may have a phase magnitude equal to an odd-integral multiple of one-half the smallest phase step of the digital phase shifter, and that the digital phase shifter may be appropriately controlled to remove any excess phase difference in steps of its smallest bit. According to either arrangement, the elements are arranged in two groups, those with and those without the phase adjustments. The elements of any group always have a phase, with respect to the other elements in the same group, which is an integral multiple of the smallest phase shifter bit. The elements always have a phase, with respect to the elements in the other group, which is an odd-integral multiple of one-half the smallest phase shifter bit.

Figure 6:
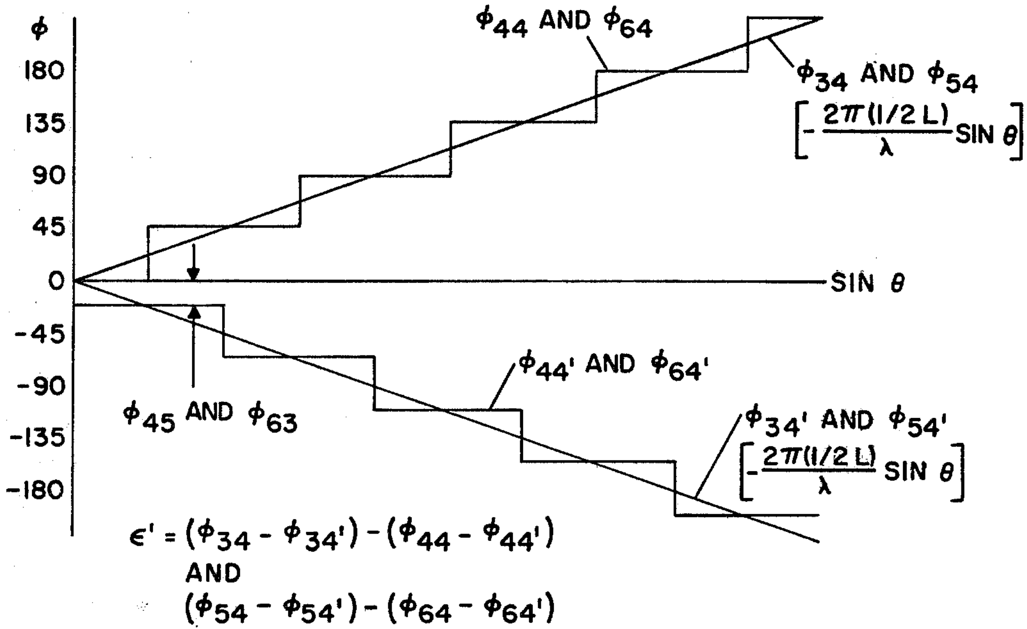
FIG. 6 is a graph illustrating phase quantization for two elements of the FIGS. 5A and 5B antennas.

FIG. 6 illustrates the ideal phase function for elements 34 and 34' of the FIG. 5A antenna, which are the same as the ideal phase functions for elements 54 and 54' of the FIG. 5B antenna, because of the assumption of equal element spacing L. The ideal functions are identical to the ideal functions for corresponding elements 14 and 14' of the FIG. 1 antenna.

Figure 3:
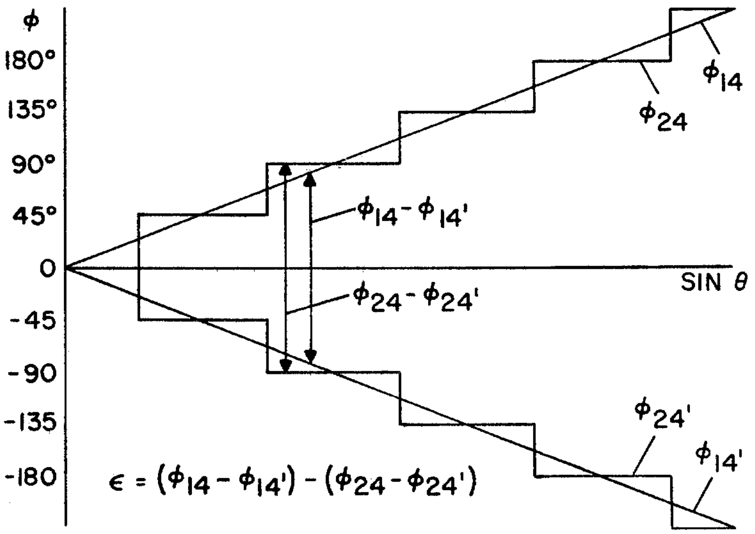
FIG. 3 (PRIOR ART)
FIG. 3 is a graph illustrating phase quantization for the elements of the FIG. 1 antenna.
Figure 4:
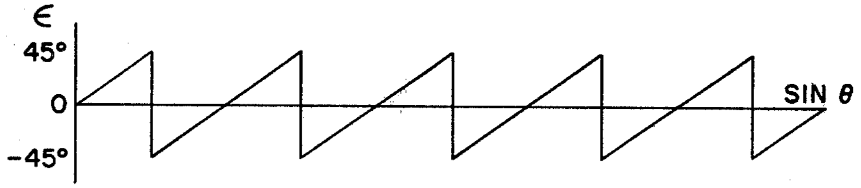
FIG. 4 (PRIOR ART)
FIG. 4 is a graph illustrating phase errors as a result of phase quantization for two elements in a pair.
Figure 7:
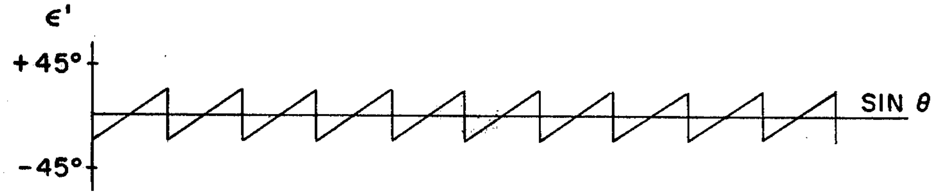
FIG. 7 is a graph illustrating phase errors as a result of phase quantization for the FIGS. 5A and 5B antennas.

The step functions in FIG. 6 illustrate the digital phase approximations for phase shifters 44 and 44' to the ideal phase function, which take into account the fixed phase difference introduced by phase adjustment 45. As compared to the graph of FIG. 3, it will be seen that phase shifter 44' is switched at different intervals of scan angle *θ* to approximate the ideal function. This difference is the result of the presence of phase adjustment 45. The fact that phase shifter 44' is changed at different scan angles than phase shifter 44 results in a reduction in the magnitude of the phase error arising out of phase quantization. In this respect, it should be noted that the quantized phase function for each of the elements has the same sense of displacement from the ideal function. Consequently, the difference between the actual quantized phase values is closer to the ideal phase difference. FIG. 7 illustrates the phase quantization error $\epsilon'$ between elements 44 and 44' of the FIG. 5A antenna, which is the same as the quantization error between elements 54 and 54' of the FIG. 5B antenna. From the graph, it may be seen that the maximum error is one-half the smallest phase shifter bit or 22.5° not 45°, which resulted from the prior art arrangement of FIG. 1.

Figure 8:
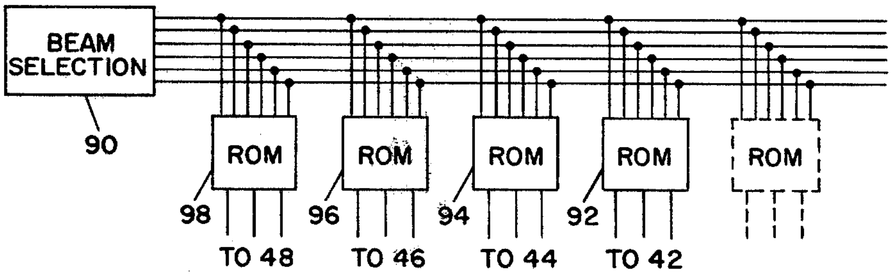
FIG. 8 is a block diagram illustrating apparatus for providing phase control signals to the phase shifters of the FIG. 1, FIG. 5, and FIG. 9 antennas.

FIG. 8 illustrates apparatus for providing phase control signals to the phase shifters of an array antenna. A beam selection device 90 provides output signals, for example logic signals representative of the desired antenna beam pointing direction. These logic signals are provided as address inputs to read-only memories 92, 94, 96, and 98 (ROM's). The read-only memories are each programmed to provide the phase-shift control signals to one of the phase shifters of the array. In accordance with the invention, the memories must be programmed to take into account the presence of the phase adjustments in the antenna coupling network. It will be recognized that the required phase control signals may be provided by other devices, such as programmed microprocessors or special purpose computer circuits.

Figure 9:
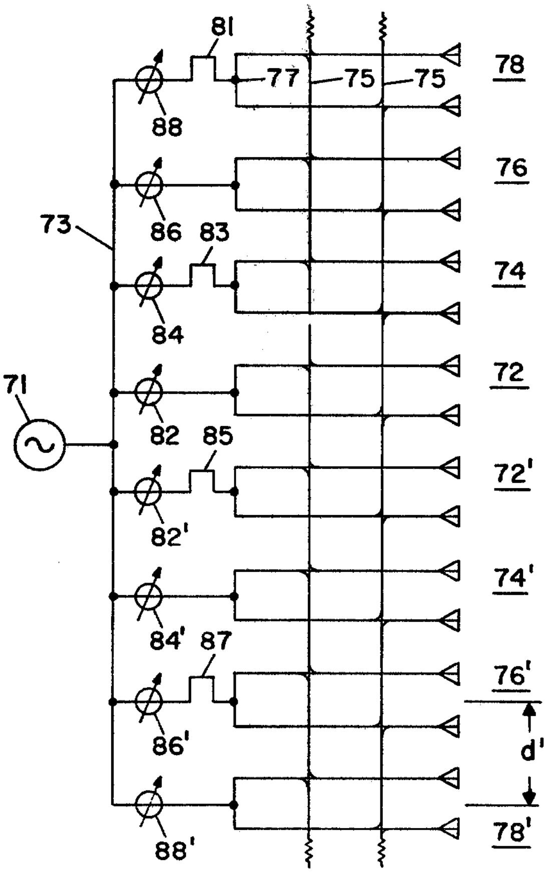
FIG. 9 is a schematic diagram of an antenna system in accordance with the present invention which is provided with antenna element intercoupling.

FIG. 9 illustrates an application of the invention to an antenna system wherein coupling means 75 are provided for interconnecting the element groups 72, 72', 74, 74', 76, 76', 78, and 78' of the array to various signal input ports 77 according to the prior U.S. Pat. No. 4,041,501 to Frazita, et al. The coupling network 73 connects transmitter 71 with ports 77 and includes phase shifters 82, 82', 84, 84', 86, 86', 88, and 88' as well as phase adjustments 81, 83, 85, and 87. The use of the present invention is of particular advantage in this type of array, because the large effective element spacing d', which results from the use of the element intercoupling network, renders the antenna more susceptible to phase quantization pointing errors than conventional phased array antennas with a phase shifter for each individual element.

Computer calculations of antenna pointing errors for an antenna of the type illustrated in FIG. 9 having 24 4-bit phase shifters have been made. For the antenna without the phase adjustments according to the invention, a 2 sigma pointing error of 0.011 degrees was calculated. When phase adjustments on both sides of the array center, in the configuration of FIG. 5A, are provided the 2 sigma pointing error from phase quantization is reduced approximately to 0.004 degrees. Phase adjustments on only one side of the array center, in the configuration of FIG. 5B reduced the 2 sigma pointing error to approximately 0.005 degrees. The pointing error experienced in an actual system naturally depends on other factors, including the effects of dynamic beam steering and receiver bandwidth characteristics.

It should be noted that for any particular array having an odd or even number of elements or element groups, the phase adjustments may be provided on alternate elements or groups as shown in FIGS. 5A and 9 or on the elements to one side of the array center as shown in FIG. 5B.

Those skilled in the art will recognize that the technique according to the invention results in a phase error between elements in a pair which is always less than one-half the smallest step of the digital phase shifter. While the invention is most easily explained in terms of antenna element pairs which are symmetrically located in a linear or planar array, those familiar with the art will recognize that the invention may be applied to randomly located element groups, or randomly located element pairs on plane or curved arrays and still achieve some of the objectives of the invention. The invention can easily be adapted to antennas which scan in more than one angular direction. Such applications and their effects can be studied easily with the aid of a digital computer using formulas well known to those skilled in the art. It should also be recognized that although the specification and claims refer primarily to transmitting antennas, such antennas are reciprocal, and the invention is equally applicable to receiving antennas.

While there have been described what are believed to be the preferred embodiments of the present invention, those skilled in the art will recognize that other and further modifications may be made thereto without departing from the true spirit of the invention, and it is intended to cover all such embodiments as fall within the true scope of the invention.

I claim:

1. A phased array antenna system, comprising:

an aperture having a plurality of antenna element pairs, the elements of each pair being oppositely located with respect to a plane passing through said aperture;

and coupling means for supplying wave energy signals to said elements, said coupling means including digital phase shifters for varying the phase of said wave energy signals in discrete phase steps, the phase length of said coupling means being selected so that wave energy signals supplied to the elements in each pair have a phase-difference which is always approximately an odd-integral multiple of one-half the smallest phase step of said phase shifters.

2. A phased array antenna system as specified in claim 1 wherein said plane passes through the center of said aperture and wherein the elements of each of said pairs are symmetrically located on said aperture with respect to said plane.

3. A phased array as specified in claim 2 wherein said phase shifters are responsive to phase control signals and wherein there are provided means for supplying phase control signals to said phase shifters to cause said coupling means to supply wave energy signals to said elements with a phase which is approximately a predetermined function, for each element, of the desired radiation angle of said array.

4. A phased array as specified in claim 3 wherein for any desired radiation angle the phase of wave energy signals supplied to each element in an element pair is less than one-half said smallest phase step from said predetermined function, and displaced in the same sense from said predetermined function, whereby the value of the difference of phase between wave energy signals supplied to the elements in a pair is within one-half of said smallest phase step from the value of the difference between said predetermined functions for said elements.

5. A phased array antenna comprising: a plurality of radiating elements arranged on an aperture plane on opposite sides of a central line on said plane formed by the intersection of a perpendicular plane, said elements being arranged in pairs, each element in a pair being symmetrically located with respect to said perpendicular plane; coupling means, including a plurality of digital phase shifters responsive to phase control signals for varying the phase of wave energy signals supplied to said elements in discrete steps, for supplying wave energy signals to said elements, said coupling means supplying wave energy signals to the elements in each pair with a phase difference equal to an odd-integral multiple of one-half the smallest of said phase steps; and control means for supplying said phase control signals to said phase shifters to vary the phase supplied to said elements to approximate a computed phase value for each element, said computed phase value being a function of the desired radiation angle from said perpendicular plane.

6. A phased array antenna as specified in claim 5 wherein said coupling means supplies wave energy signals to each element with a phase which is different from the phase of wave energy signals supplied to at least one adjacent element by an odd-integral multiple of one-half of said smallest phase step.

7. A phased array as specified in claim 5 wherein said coupling means supplies wave energy signals to each element on one side of said line with a phase which is an integral multiple of said smallest phase step with respect to any other element on the same side of said line.

8. In a phased array antenna system having an aperture comprising an array of radiating elements and means for coupling wave energy signals to said elements, said coupling means including digital phase shifters for varying the phase of wave energy signals supplied to said elements in selected discrete phase steps, the improvement wherein said array includes first and second element groups, and said coupling means supplies wave energy signals to each of said elements in said first group with a phase with respect to a selected element in said first group which is approximately an integral multiple of the smallest step of said phase shifters, and wherein said coupling means suppplies wave energy signals to each of said elements in said second group with a phase with respect to said selected element which is approximately and odd-integral multiple of one-half the smallest step of said phase shifters.

9. The improvement specified in claim 8 wherein said elements are arranged along a line and wherein said first group comprises alternate elements along said line.

10. The improvement specified in claim 8 wherein said elements are arranged along a line and wherein said first group comprises elements on one side of the center of said line.

11. In a phased array antenna wherein a plurality of antenna elements are arranged on an aperture, wherein there is provided a coupling network for coupling supplied wave energy signals to said elements, said network including a plurality of digital phase shifters responsive to phase control signals for varying the phase of wave energy supplied to said elements in discrete phase steps and wherein there is provided means for generating said phase control signals to cause said coupling means to supply wave energy signals to said elements with a phase which approximates an ideal phase function of a desired radiation angle for each element, said ideal phase function being selected to cause reinforcement of radiation from said elements in said desired radiation angle, the improvement wherein the phase lengths of said coupling means and said ideal phase functions are selected to cause the phase difference between signals supplied to the elements in selected element pairs to be within one-half of the smallest phase step from the difference between said ideal phase functions for the elements in said element pairs.

12. The improvement of claim 11 wherein said selected element pairs comprise elements symmetrically located with respect to the center of said array.

* * * * *